US007164551B2

(12) United States Patent
Urano et al.

(10) Patent No.: US 7,164,551 B2
(45) Date of Patent: Jan. 16, 2007

(54) TAPE CASSETTE AND TAPE DRIVER

(75) Inventors: Masahiro Urano, Kanagawa (JP); Yoshihisa Takayama, Kanagawa (JP); Hiroshi Ishibashi, Kanagawa (JP); Tatsuya Kato, Kanagawa (JP)

(73) Assignee: Sony Corporation (JP)

( * ) Notice: Subject to any disclaimer, the term of this patent is extended or adjusted under 35 U.S.C. 154(b) by 432 days.

(21) Appl. No.: 10/474,161

(22) PCT Filed: Feb. 27, 2003

(86) PCT No.: PCT/JP03/02262

§ 371 (c)(1), (2), (4) Date: Oct. 7, 2003

(87) PCT Pub. No.: WO02/073424

PCT Pub. Date: Sep. 4, 2003

(65) Prior Publication Data

US 2004/0114266 A1 Jun. 17, 2004

(30) Foreign Application Priority Data

Feb. 28, 2002 (JP) ............................ 2002-055071

(51) Int. Cl.
*G11B 5/584* (2006.01)

(52) U.S. Cl. .................................................. 360/77.12

(58) Field of Classification Search ..................... None
See application file for complete search history.

(56) References Cited

U.S. PATENT DOCUMENTS

| | | | | |
|---|---|---|---|---|
| 5,485,606 | A | 1/1996 | Midgdey et al. | |
| 6,519,105 | B1 | 2/2003 | Takayama | |
| 6,570,729 | B1 * | 5/2003 | Takayama | 360/69 |
| 6,580,576 | B1 * | 6/2003 | Takayama | 360/69 |
| 2001/0017743 | A1 | 8/2001 | Hamai et al. | |

FOREIGN PATENT DOCUMENTS

| | | | |
|---|---|---|---|
| EP | 0 862 180 | A2 | 9/1998 |
| EP | 0 903 940 | A1 | 3/1999 |
| EP | 0 997 908 | A1 | 5/2000 |
| JP | 2000-182357 | A1 | 6/2000 |
| WO | WO-89/10615 | A1 | 11/1989 |

* cited by examiner

*Primary Examiner*—Hoa Thi Nguyen
*Assistant Examiner*—Mitchell Slavit
(74) *Attorney, Agent, or Firm*—Lerner, David, Littenberg, Krumholz & Mentlik, LLP

(57) ABSTRACT

A tape drive apparatus employing a tape cassette including a solid-state memory in a cassette half unit that accommodates a magnetic tape. When recording application data on the magnetic tape, the application data is written in an area of a preset size of the memory, beginning from a leading end of the application data. In this manner, it is assured that the management information located at the leading end of the application data can be stored in the memory. In reproducing the application data from the tape cassette, the management information stored in the memory is exploited to save time in accessing the management information recorded on the magnetic tape.

2 Claims, 12 Drawing Sheets

10 BUFFER MEMORY 23 20 21 19 SCSI COMPRESSION/ EXPANSION IF/ECC CONTROLLER 22 RF 3 13B 12B 12A 11 16 17 15 SYSTEM CONTROLLER SERVO CONTROLLER MECHANICAL DRIVER DM 14A CM 14B SRM 14C TRM 14D 13A P 13C 40 HOST COMPUTER APPLICATION 41 SRAM FLASH ROM 24 25 EEP-ROM 18 4A MIC (REMOTE TYPE) 4a 30 (REMOTE MEMORY I/F) 31 32 33 DATA I/F RF I/F 4B MIC (CONTACT TYPE) 27 CONNECTOR

RECORD (VARIABLE LENGTH)
RECORD
RECORD
RECORD
RECORD

ENTITY (VARIABLE LENGTH)
ENTITY HEADER
RECORD
RECORD
RECORD
DATA (COMPRESSED RECORD GROUP)
ENTITY (VARIABLE LENGTH)

GROUP (FIXED LENGTH)
ENTITY
ENTITY
ENTITY
BAT
BAT
BAT
GIT
GROUP (FIXED LENGTH)

RECORD (VARIABLE LENGTH)
RECORD
RECORD
RECORD
RECORD
RECORD

ENTITY (VARIABLE LENGTH)
ENTITY HEADER
RECORD
RECORD
RECORD
DATA (NON-COMPRESSED RECORD GROUP)
ENTITY (VARIABLE LENGTH)

GROUP (FIXED LENGTH)
ENTITY
ENTITY
ENTITY
BAT
BAT
BAT
GIT
GROUP (FIXED LENGTH)

GROUP
CACHE DATA
ENTITY #0
ENTITY #1
. . . .
ENTITY #N

ENTITY
RECORD LENGTH
: 64KB
NUMBER OF RECORDS
: 10
LEADING CACHE RECORD
ENTITY HEADER
RECORD #0
RECORD #1
. . .
RECORD #9
RECORD LENGTH
: 128KB
NUMBER OF RECORDS
: 4
ENTITY HEADER
RECORD #10
RECORD #11
RECORD #12
RECORD #13
EFFECTIVE CACHE RECORD (12)
CACHE DATA
A
B
C

TAPE CASSETTE AND TAPE DRIVER

TECHNICAL FIELD

This invention relates to a tape cassette, having housed therein a magnetic tape used for data storage, and to a tape driving apparatus employing this tape cassette.

This application claims priority of Japanese Patent Application No.2002-055071, filed on Feb. 28, 2002, the entirety of which is incorporated by reference herein.

Background Art

Up to now, a so-called tape streamer drive is known as a recording and/or reproducing apparatus for recording and/or reproducing digital data on a magnetic tape. This tape streamer drive is able to have an exorbitant recording capacity on the order of, for example, hundreds of GBs, depending on the length of the magnetic tape housed in the tape cassette as a medium. Consequently, this sort of the tape cassette is used for backup of data recorded on a medium, such as a hard disc housed in a computer. Moreover, the tape cassette is also usable with advantage for saving moving picture data of a large data size to a large capacity.

For example, such tape streamer drive has been proposed which exploits a tape cassette, having housed a magnetic tape, as a recording medium, and which is adapted for recording and/or reproducing data for the magnetic tape by a rotary head in accordance with the helical scan system.

The tape streamer drive, exploiting the tape cassette, uses e.g. SCSI (Small Computer System Interface)as an input/output interface for recording/reproducing data. During recording, data supplied from e.g. a host computer is input over an SCSI interface. The input data is transmitted every preset fixed length data unit and, if necessary, is compressed in accordance with a preset system and transiently stored in a buffer memory. The data stored in a buffer memory is ultimately supplied to a recording and/or reproducing system every preset fixed length unit termed a group and recorded by a rotary head on the magnetic tape accommodated in the tape cassette.

In reproduction, data of the magnetic tape is read out by a rotary head so as to be transiently stored in the buffer memory. If the data is already compressed in recording, it is expanded and transmitted to the host computer over an SCSI interface.

Among the data recorded on this tape streamer drive, there are data archived (compressed) and backup data used in a computer system for data backup, inclusive of the archived data. These archived data or backup data are recorded by a specified archiving software or a backup application booted on the host computer connected to the tape streamer drive. That is, the host side application formulates the archived data or backup data to transmit the data to the tape streamer drive, while controlling the data writing in the tape streamer drive.

The application data, written by the application as described above, is usually composed of the management information at the leading end followed by user data. the management information, including the information on the structure of the user data, is the various information necessary for reproducing the user data. Thus, in reproducing the user data, recorded on the magnetic tape, the management information at the leading end is first accessed and transmitted to the host. The host side application exploits the contents of the management information transmitted to instruct the tape streamer drive to read out user data. Responsive to the command, the tape streamer drive accesses the required magnetic tape position to read out data to transmit the read out data to the host. The host exploits the transmitted data to execute the necessary processing operations, such as re-storing.

The application data is based on the management information as described above. Thus, in reproducing the application data, it is mandatory to access and read out the management information at the leading end of the application data.

The time needed in accessing the management information is necessarily prolonged, depending on the pre-access tape position, inasmuch as it is necessary to run the magnetic tape physically to access the management information.

It may therefore be that the time which elapses until the necessary user data is read out is prolonged due to the time for accessing the management information.

The access time needed in reading out the user data is desirably reduced to the shortest time possible.

DISCLOSURE OF THE INVENTION

It is therefore an object of the present invention to provide a novel recording medium and a tape drive apparatus in which the above-mentioned problems in the conventional practice may be overcome.

It is another object of the present invention to provide a tape cassette and a tape drive apparatus in which the time until readout of the necessary user data from the application data recorded on the magnetic tape may be shortened to enable prompt readout of the user data.

For accomplishing the above objects, the present invention provides a tape cassette including a cassette half unit having a magnetic tape housed therein to give a tape-cassette half unit, and a memory provided to the tape-cassette half unit, wherein a storage area of a preset capacity for storing application data, which is to be recorded on the magnetic tape and which is handled by a preset application software, from a leading data position, is set in the memory.

The present invention also provides a tape driving apparatus for recording and/or reproducing data for a tape cassette including a cassette half unit having housed therein a magnetic tape to give a tape-cassette half unit and a memory provided to the tape-cassette half unit. The tape driving apparatus comprises tape driving means for recording and/or reproducing data for the magnetic tape of the tape-cassette half unit in a loaded position, memory write control means for writing and storing application data, which is data to be recorded on the magnetic tape by the tape driving means and which is handled by a preset application software, in a storage area of a predetermined capacity in the memory, beginning from the leading position of the application data, memory readout means for reading at least the application data from the memory of the tape cassette, and transmission means for reading out the application data read out from the memory for transmitting the so read out data to a host side of the tape driving apparatus as data read out form the magnetic tape.

The tape cassette according to the present invention includes a memory in the cassette half unit having housed therein a magnetic tape for which data is recorded and/or reproduced. A tape driving apparatus, employing this tape cassette as a recording medium, writes the application data, to be written on the magnetic tape, from its leading position, in an area of a preset capacity of a memory provided in the tape cassette. Since the data in the leading part of the application data is stored in the memory provided to the tape cassette, the contents of at least the application data effectively stored in the memory may subsequently be recognized, by reading in the contents stored in the memory, without the necessity of accessing the leading part of the application data on the magnetic tape.

Other objects, features and advantages of the present invention will become more apparent from reading the embodiments of the present invention as shown in the drawings.

BEST MODE FOR CARRYING OUT THE INVENTION

Figure 1:
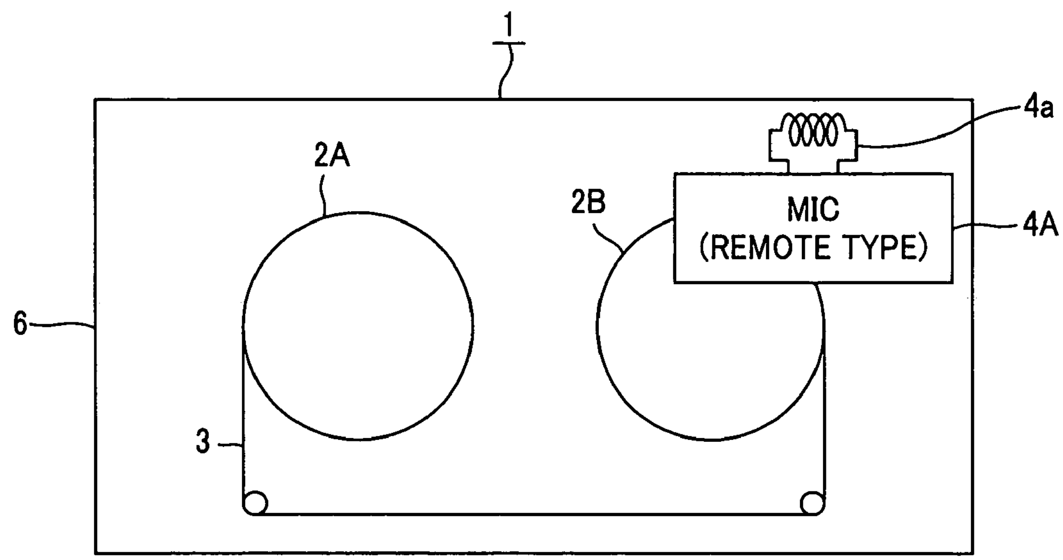
FIG. 1 is a plan view showing an inner structure of an embodiment of a tape cassette according to the present invention.

Referring to the drawings, a tape cassette and a tape streamer drive employing this tape cassette, according to the present invention, are now explained.

First, the tape cassette according to the present invention is explained.

A tape cassette 1 according to the present invention includes a pair of tape reels 2A, 2B, rotatably mounted within a cassette half unit 6, and a magnetic tape 3, with a tape width of 8 mm, placed on these tape reels 2A, 2B, as shown in FIG. 1. Within the cassette half unit 6 of the tape cassette 1, there is provided a remote MIC 4A, having enclosed therein a non-volatile memory and a control circuit therefor. The remote MIC 4A effects data transmission by radio communication with a remote memory interface 30 of a tape streamer drive or a library device, which will be explained subsequently. This remote MIC 4A is provided with an antenna 4*a* for effecting radio data transmission.

The remote MIC 4A is able to store the information pertinent to the manufacture data or the serial number for each tape cassette, tape thickness, length or material or partition-based use hysteresis of the recording data, the user information and so forth. The detailed description of the remote MIC 4A is herein omitted for simplicity.

Meanwhile, the various information stored in the remote MIC 4A is mainly used for variegated management for recording and/or reproducing the magnetic tape 3 and hence is comprehensively termed the [management information].

In the tape streamer drive in which a non-volatile memory is provided in the cassette halves of the tape cassette and the management information is stored in this non-volatile memory to cope with the tape cassette, there is provided the interface for write/readout for the non-volatile memory, and the management information pertinent to data recording and/or reproduction for the magnetic tape is read out from or written in the non-volatile memory to effect efficient recording and/or reproduction for the magnetic tape.

For example, in loading/unloading the tape cassette for the drive, it is unnecessary to take up the magnetic tape to the tape top. That is, the magnetic tape can be loaded or unloaded in any tape position. Data editing may be carried out by rewriting the management information on the non-volatile memory. It is moreover possible to set more partitions on the magnetic tape and to properly manage these partitions.

Figure 2:
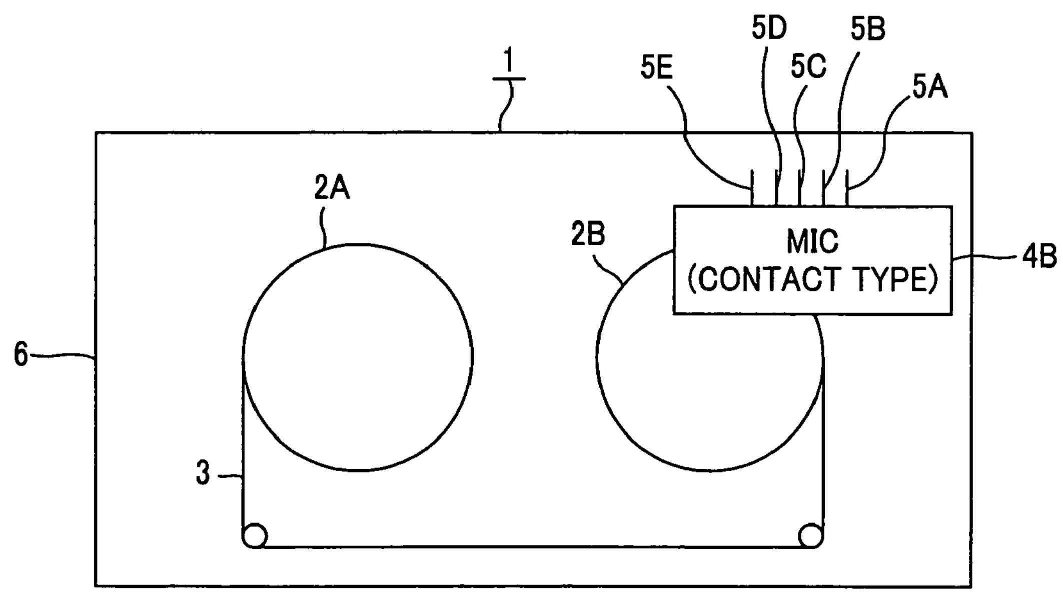
FIG. 2 is a plan view showing an inner structure of another embodiment of a tape cassette according to the present invention.

With the tape cassette 1 of the present invention, a contact type MIC 4B (non-volatile memory) may be enclosed in the cassette half unit 6, as shown in FIG. 2. With the tape cassette 1, shown in FIG. 2, five terminals 5A to 5E are derived from a module of the contact type MIC 4B and designed as a power supply terminal, a data input terminal, a clock input terminal, a grounding terminal and as a spare terminal, respectively. As data in the contact type MIC 4B, the management information similar to that stored in the remote MIC 4A as a remote memory chip is stored.

Figure 3:
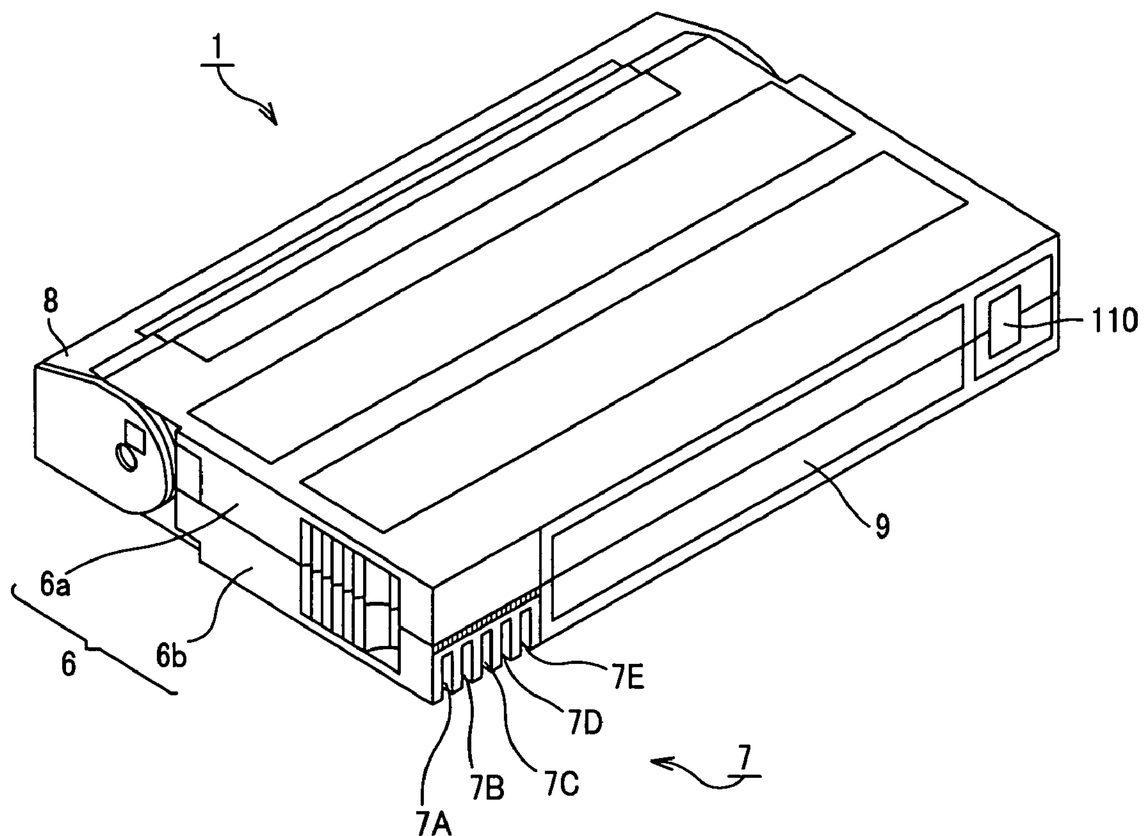
FIG. 3 is a perspective view showing the appearance of a tape cassette according to the present invention.

Turning to a specified structure of the tape cassette 1, shown in FIGS. 1 and 2, this tape cassette 1 includes a cassette half unit 6, composed of an upper half 6*a* and a lower half 6*b*, paired to each other, and a guard panel 8 for opening/closing the front side of the cassette half unit 6, from which the magnetic tape 3 is taken out, as shown in FIG. 3. that is, the tape cassette 1 has a basic structure in common with a tape cassette used for a routine 8 mm VTR.

A terminal unit 7 is provided in the vicinity of a labeled surface 9 provided on a planar side of the tape cassette 1, as shown in FIG. 3. In a tape cassette, having enclosed therein the contact type MIC 4B, shown in FIG. 2, electrode terminals are provided in this terminal unit, which is provided with terminal pins 7A to 7E. These terminal pins 7A to 7E are connected to terminals 5A to 5E shown in FIG. 2. That is, the tape cassette 1, having the contact type MIC 4B, is physically contacted with the tape streamer drive 10, as later explained, to effect e.g. data transmission via terminal pins 7A to 7E.

On the other hand, the tape cassette 1, having enclosed therein a non-contact remote memory chip, as MIC, as shown in FIG. 1, no terminal pins are needed, as a matter of course. The tape cassette 1 has an outer shape in common with the tape cassette 1 shown in FIG. 2, having enclosed therein the contact type MIC 4B, in order to provide for compatibility with the tape cassette 1. Thus, even in the tape cassette employing the non-contact remote memory chip, shown in FIG. 1, a dummy terminal is provided for assuring the compatibility.

It should be noted that, if, in the following explanation, the remote MIC 4A and the non-contact type MIC 4B are discussed collectively, or the remote MIC 4A and the non-contact type MIC 4B are discussed in case these do not have to be distinguished from each other, these are referred to simply as MIC 4.

The tape streamer drive embodying the present invention is now explained with reference to FIG. 4. The tape streamer drive 10 is constructed so that the magnetic tape 3 enclosed in the tape cassette 1 is recorded or reproduced by a helical scan system, using a rotary magnetic head device.

Figure 4:
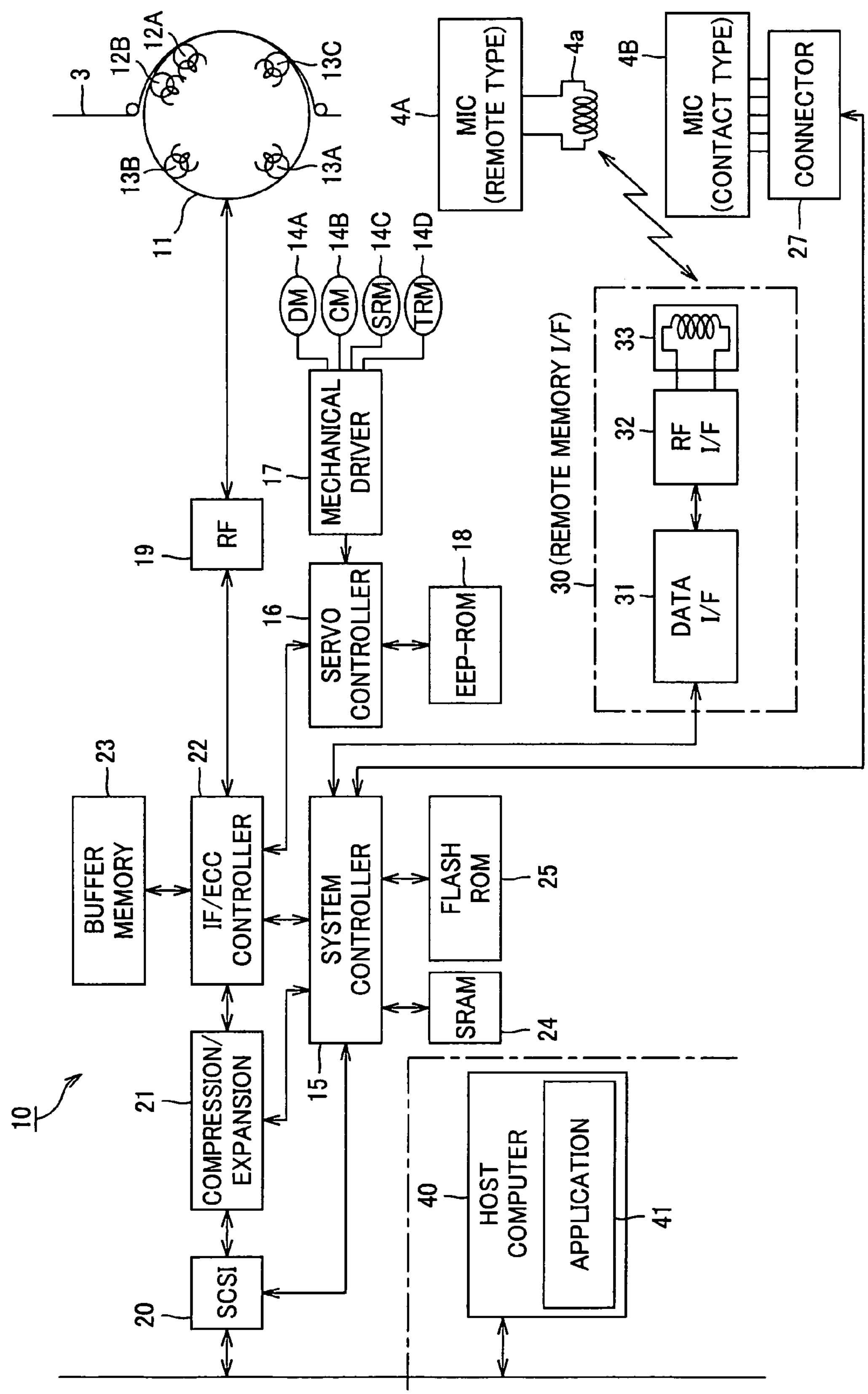
FIG. 4 is a block diagram showing a tape streamer drive according to the present invention.

Referring to FIG. 4, a rotational drum 11, forming the rotational magnetic head device, is provided e.g. with two recording heads 12A, 12B and three reproducing heads 13A to 13C. The recording heads 12A, 12B are provided with two magnetic gaps of respective different azimuth angles arranged in close proximity to each other. The reproducing heads 13A, 13B, similarly provided with respective different azimuth angles, are arranged at an angular distance of, for example, 90E relative to each other.

The magnetic tape 3, pulled out from the tape cassette 1, is placed around the rotational drum 11, run in rotation by a drum motor 14A. The magnetic tape 3 is fed by a capstan motor 14B and a pinch roll, not shown. The magnetic tape 3, placed around the reels 2A, 2B, as described above, is run in rotation in the forward direction and in the reverse direction by reel motors 14C, 14D, respectively.

A mechanical driver 17 actuates the motors 14A to 14D under control by a servo controller 16. The servo controller 16 performs rotational control of the respective motors to execute tape running under normal recording or reproduction, fast reproduction, fast feed and rewind operations.

Meanwhile, in an EEP-ROM 18, constants etc used by the servo controller 16 for servo control of the respective motors are stored.

The servo controller 16 is bidirectionally connected via an interface controller/ECC formatter 22 (referred to below as an IF/ECC controller) to a system controller 15 responsible for overall system control.

In this tape streamer drive 10, a SCSI interface 20 is used for data input/output. For example, in data recording, data is sequentially input from a host computer 40, via SCSI interface 20, in terms of a fixed length record, as a unit of transmitted data, and is supplied to a compression/expansion circuit 21. In this tape streamer drive system, there is such a mode in which data is transmitted from the host computer 40 in terms of a set of data of variable length as a unit of transmitted data.

The compression/expansion circuit 21 compresses input data in accordance with a predetermined system, if necessary. In such case, the ALDC (adaptive lossless data compression) system is used. If the data size of user data recordable on one magnetic tape 3 in case of non-compression is 500 GB, it may be increased to for example 1300 GB by compression.

An output of the compression/expansion circuit 21 is supplied to an IF/ECC controller 22. This IF/ECC controller 22, by its own control operation, transiently stores the output of the compression/expansion circuit 21 in a buffer memory 23. Under control by the IF/ECC controller 22, the data stored in the buffer memory 23 is formed into a fixed length unit, termed a group, corresponding to a predetermined number of tracks on the magnetic tape. It is on this data that ECC formatting processing is performed.

By way of ECC formatting processing, an error correction code is appended to the recording data and modulation processing is carried out on the data for adaptation to magnetic recording. The resulting data is sent to an RF processor 19.

The recording data, supplied to the RF processor 19, is amplified and recording-equalized for recording to generate recording signals which are then supplied to the recording heads 12A, 12B. This enables data to be recorded from the recording heads 12A, 12B to the magnetic tape 3.

The tape reproducing operation is now briefly explained. The recording data of the magnetic tape 3 is read out as RF replay signals by reproducing heads 13A, 13B. The replay output is processed by the RF processor 19 with replay equalization, replay clock generation, binary encoding and decoding (such as viterbi decoding).

The signals read out is then sent to the IF/ECC controller 22 so as to be processed first with error correction. The signals corrected for errors are transiently stored in the buffer memory 23 and read out at predetermined time point so as to be supplied to the compression/expansion circuit 21.

The compression/expansion circuit 21 operates, based on decision by the system controller 15, so that, if the data has been compressed in recording by the compression/expansion circuit 21, the data is expanded, whereas, if the data is not compressed, the data is directly output, without e.g. data expansion.

Output data of the compression/expansion circuit 21 is output via SCSI interface 20 as replay data to the host computer 40.

FIG. 4 shows, as MIC 4 in the tape cassette 1, both the remote MIC 4A and the contact type MIC 4B. In actuality, however, the tape cassette 1 with the MIC is provided with one of both the remote MIC 4A and the contact type MIC 4B.

When the tape cassette 1 is loaded on the tape streamer drive, the remote MIC 4A is able to input data to or output data from the system controller 15 via remote memory interface 30.

As the remote memory interface 30, there are provided a data interface 31, a RF interface 32 and an antenna 33.

The operation of the remote memory interface 30 may be summarized as follows:

The data interface 31 exchanges data with the system controller 15. It is noted that data transfer to and from the remote MIC 4A is carried out in the form of command transmission from the equipment and acknowledge return from the remote MIC 4A responsive to receipt of the transmitted command. When the system controller 15 issues a command to the remote MIC 4A, the data interface 31 receives command data to send the received data to the RF interface 32. The RF interface 32 is also supplied from data interface 31 with the carrier frequency (13 MHz).

The RF interface 32 amplitude-modulates the command transmission data (100 kHz) for superposition on the carrier frequency. The resulting modulated signals are amplified and output to the antenna 33. In this manner, the command data are transmitted from the antenna 33 over a radio route to an antenna 4*a* in the tape cassette 1. On receipt of the command data over antenna 33, the tape cassette 1 is supplied with the power and turned on so that the system controller within the remote MIC 4A executes the required operations responsive to the contents specified by the commands. For example, the data sent with a write command is written in the EEP-ROM.

When the command is issued in this manner from the remote memory interface 30, the remote MIC 4A issues an associated acknowledge which is transmitted and output over antenna 4*a*.

When the acknowledge is transmitted and received by the antenna 33, the received signal is rectified within the RF interface 32 and demodulated as data binary-coded by for example a comparator, not shown. This data is supplied from the data interface 31 to the system controller 15. For example, if a readout command is issued from the system controller 15 to the remote MIC 4A, the remote MIC 4A sends data from an internal memory device, along with a corresponding acknowledge code. The acknowledge code and the data as read out are received and demodulated by the remote memory interface 30 and thence supplied to the system controller 15.

The tape streamer drive 10, provided with the remote memory interface 30, as described above, is able to access a remote memory chip 4 in the tape cassette 1.

In such contact-free data communication, data is superposed on the carrier wave in a band of 13 MHz by 100 kHz amplitude modulation, with the original data being packetized data. That is, the data in the form of commands or acknowledge are packetized by appending the necessary information, such as header or parity, and the resulting packets are modulated following code conversion to enable transmission/reception as stable RF signals.

The technique for realization of this contact-free interface was already introduced as the technique applied for by the present Applicant and registered for patent (U.S. Pat. No. 2,550,931).

With the tape cassette 1, employing the contact type MIC 4B, when the tape cassette 1 is loaded on the tape streamer drive 10, contacts 7A to 7E shown in FIG. 3 are contacted with a connector 27 provided on the tape streamer drive 10 for establishing electrical contact such as to permit data input/output for the system controller 15. In this manner, the system controller 15 is able to read in the management information recorded in the contact type MIC 4B in the tape cassette 1 or to update the so recorded management information.

The information transfer between the tape streamer drive 10 and the host computer 40 occurs via SCSI interface 20 as described above. On the other hand, an application booted on the host computer 40 is responsible for executing various communication with the system controller 15, using SCSI commands.

Thus, the host computer 40 is able to instruct the system controller 15 by the SCSI commands to write or read out data for the MIC 4.

In a S-RAM 24 or a flash ROM 25, there are stored data used for various processing operations by the system controller 15.

For example, constants etc. used for control are stored in the flash ROM 25. The S-RAM 24 is such a memory used as a work memory or used for storage or calculation of data read out from the MIC 4, mode data set on the tape cassette basis (initializing format) or a variety of flag data.

Meanwhile, the S-RAM 24 and the flash ROM 25 may be configured as internal memories for a micro-computer forming the system controller 15. Alternatively, a portion of a storage area of the buffer memory 23 may be used as a work memory.

In the above-described configuration, the S-RAM 24 and the flash ROM 25 may be configured as internal memories of a micro-computer forming the system controller 15 or a portion of a storage area of the buffer memory 23 may be used as a work memory 24.

The data structure on a magnetic tape 3 housed in the tape cassette 1 used for the tape streamer drive 10 according to the present invention is hereinafter explained.

Figure 5:
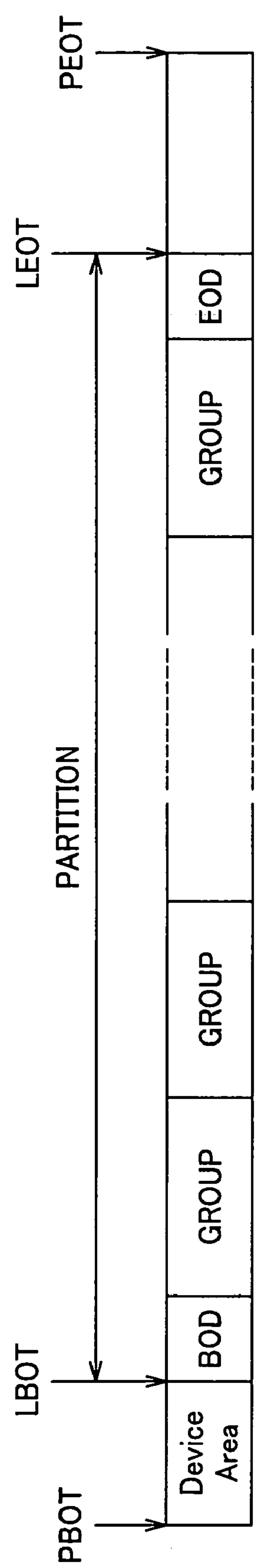
FIG. 5 is a diagrammatic view showing a data structure of a magnetic tape used in the present invention.

For the magnetic tape 3, used in the present invention, data is recorded by a structure shown in FIG. 5. According to the present invention, partitions are set for a sole magnetic tape 3, as shown in FIG. 5. Although such a state is shown in FIG. 5 in which only one partition is formed for the entire tape length, a sole magnetic tape may actually be divided into plural partitions.

The magnetic tape 3, used in the present invention, is provided with a leader tape at each end connected to tape reels 2A, 2B. Next to the leader tape, there is provided a device area as an area for loading the tape cassette on the tape streamer drive 10 or unloading the tape cassette therefrom. The leading area of this device area becomes the leading position of physical tape PBOT (Physical Beginning Of Tape).

Next to the device area, the partitions of the magnetic tape 3 are provided. This beginning portion of the partitions is the beginning position of logical tape LBOT (Logical Beginning Of Tape). At the leading end of the partition, beginning from the LBOT, there is provided a BOD (Beginning Of Data) area which is an area indicating the beginning of the partitions. At the trailing end of the partitions, there is provided an area indicating the end of the partitions or EOD (End of Data). The trailing end of the EOD is a end position of logical tape LEOD (Logical End Of Tape). The end position of physical tape is indicated by PEOT (Physical End of Tape).

The data recorded in a partition of the magnetic tape 3 is formed by a continuum of units termed a group (Group). This data unit of the Group is of a fixed length and is to be a recording and/or reproducing unit of data on the magnetic tape 3 by the tape streamer drive 10. The ECC formatting and error correction processing are executed with this Group as a unit.

The process of signal processing until forming the Group in recording data on the magnetic tape 3 is hereinafter explained.

In recording the data, the data supplied from the host computer 40 to the tape streamer drive 10 is transmitted for recording in terms of the Record of a fixed length as a unit, as explained briefly with reference to FIG. 4. That is, the Record is a data unit for data transmission under the SCSI format.

When the data input via SCSI format is recorded on the magnetic tape 3 by the tape streamer drive 10, the data is formed into the Group in terms of a plural number of records (Records) as a unit.

In forming the Groups, the Record-based data may be grouped after compression by the compression/expansion circuit 21 in accordance with the ALDC system, or the Record-based data in an uncompressed state may be grouped. The grouping processing for each of these two cases is hereinafter explained.

Figures 6A, 6B, 6C:
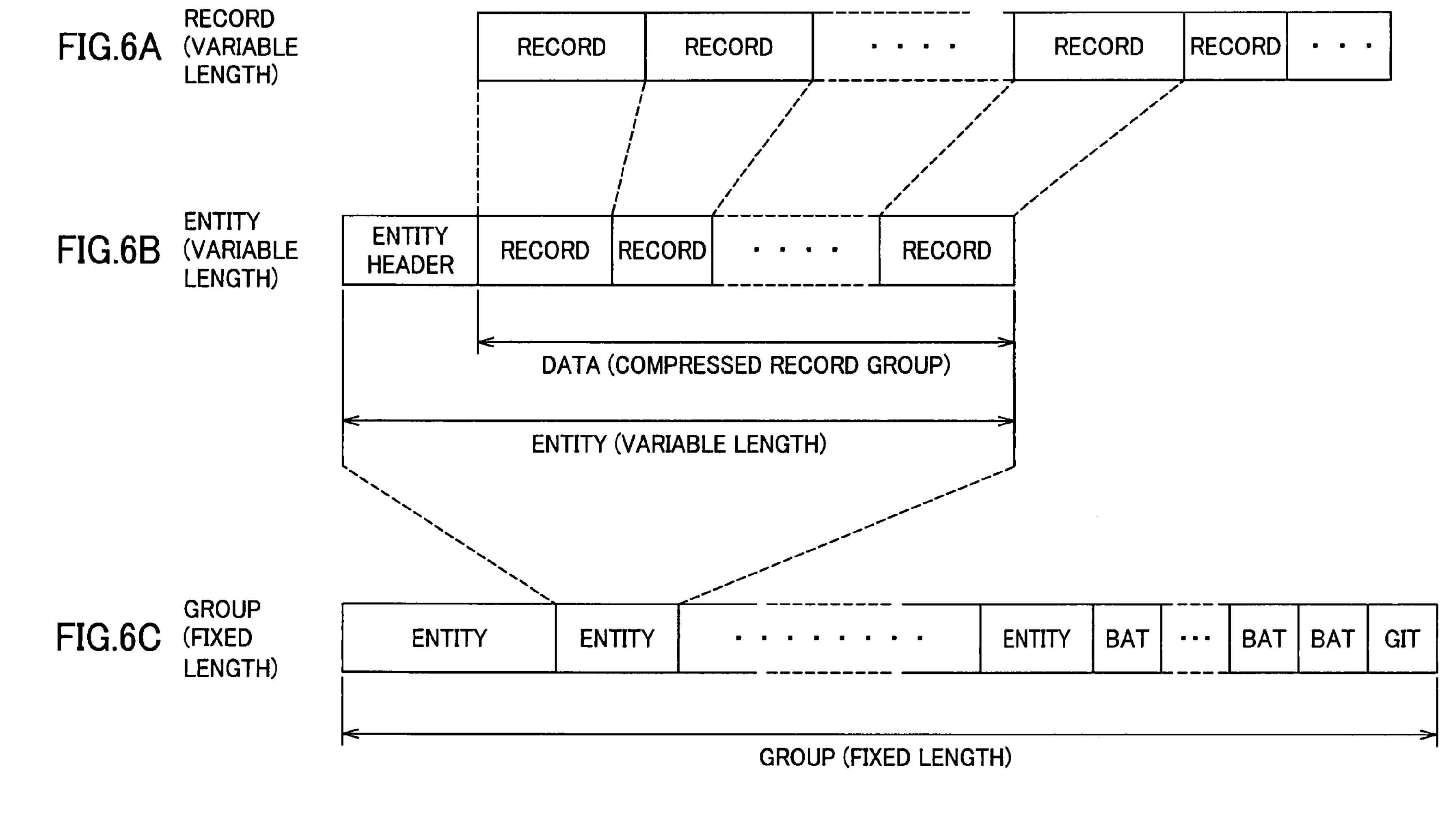
FIGS. 6A, 6B and 6C are diagrammatic views showing the processing of grouping by compressed records (Records).

Referring first to FIGS. 6A to 6C, the case of grouping of the set of Groups, compressed by the compression/expansion circuit 21, is explained.

FIG. 6A shows Record-based data supplied from the host computer 40. When the records (Records) shown in FIG. 6A are sequentially input to the tape streamer drive and compressed, the data size is changed depending on the Record-based data contents.

The tape streamer drive 10 forms a data unit, termed entity (Entity), shown in FIG. 6B, from the compressed data of the plural records (Records). This entity (Entity) forming operation is carried out, under control by the system controller 15, with the buffer memory 23 as a work area.

Figure 8:
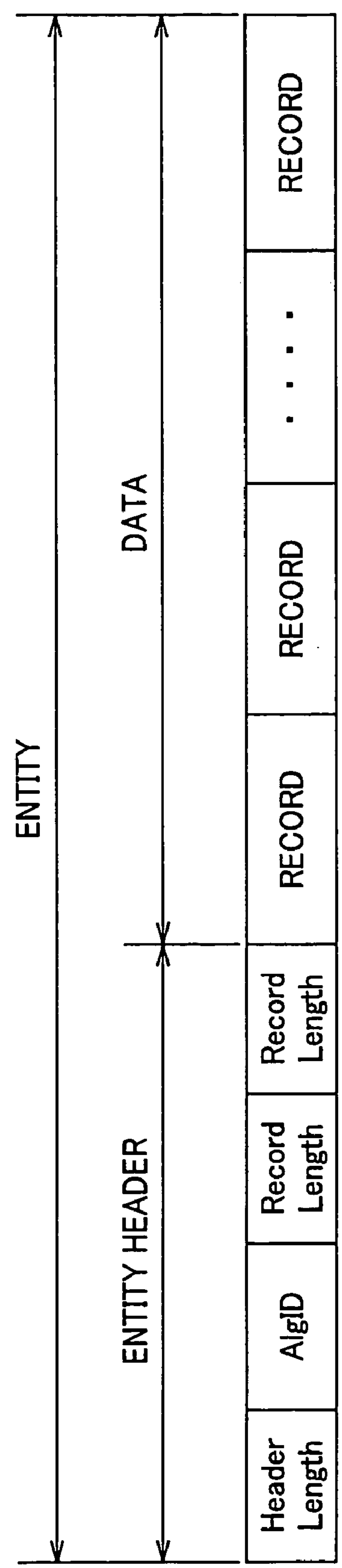
FIG. 8 shows a structure of entity (Entity) data.

Referring to FIG. 8, the structure of the entity (Entity) is explained.

The entity is made up by an entity header (Entity Header), located at the leading end, and a data area, where data is stored in terms of the records (Records) as unit.

In a leading location of the entity header, the Header Length, indicating the data length of the entity header, is arranged.

Next to the Header length is arranged an Algorithm ID for indicating the species of the algorithm by binary notation. Briefly, the Algorithm ID=1, for example, indicates that the records contained in the current entity are non-compressed data. The Algorithm ID=3 indicates that data contained in the current entity have been compressed in accordance with the ALDC system.

Next to the Algorithm ID is arranged the Record Length. This Record Length indicates e.g. the information on the original data length of the record. In this case, the original data length is 512 bytes, as explained previously.

In the Record Number, next following the Record Length, the information on the number of records contained in the current entity is stored.

After forming the records into the entity by the above-described structure, data grouping is performed from the plural entities which are of variable lengths as a result of compression, as shown for example in FIG. 6C. Referring to FIG. 6C, plural BATs (Block Address Tables) are arranged next to the last entity forming the Group, and a sole GIT (Group Information Table) is arranged at the trailing end. That is, the Group is made up by data composed of plural entities, plural BATs and one GIT. This GIT is of a fixed length of, for example, 40 bytes, and stores the information indicating the contents of the current Group. The BAT stores the management information in terms of entities contained in the current group as units. The BAT is made up by 4 byte based access entries, formed from one entry to the next, and hence is of a variable length depending on the contents of the group. The data is recorded (written) on the magnetic tape 3, with the so formed group as a unit.

Figures 7A, 7B, 7C:
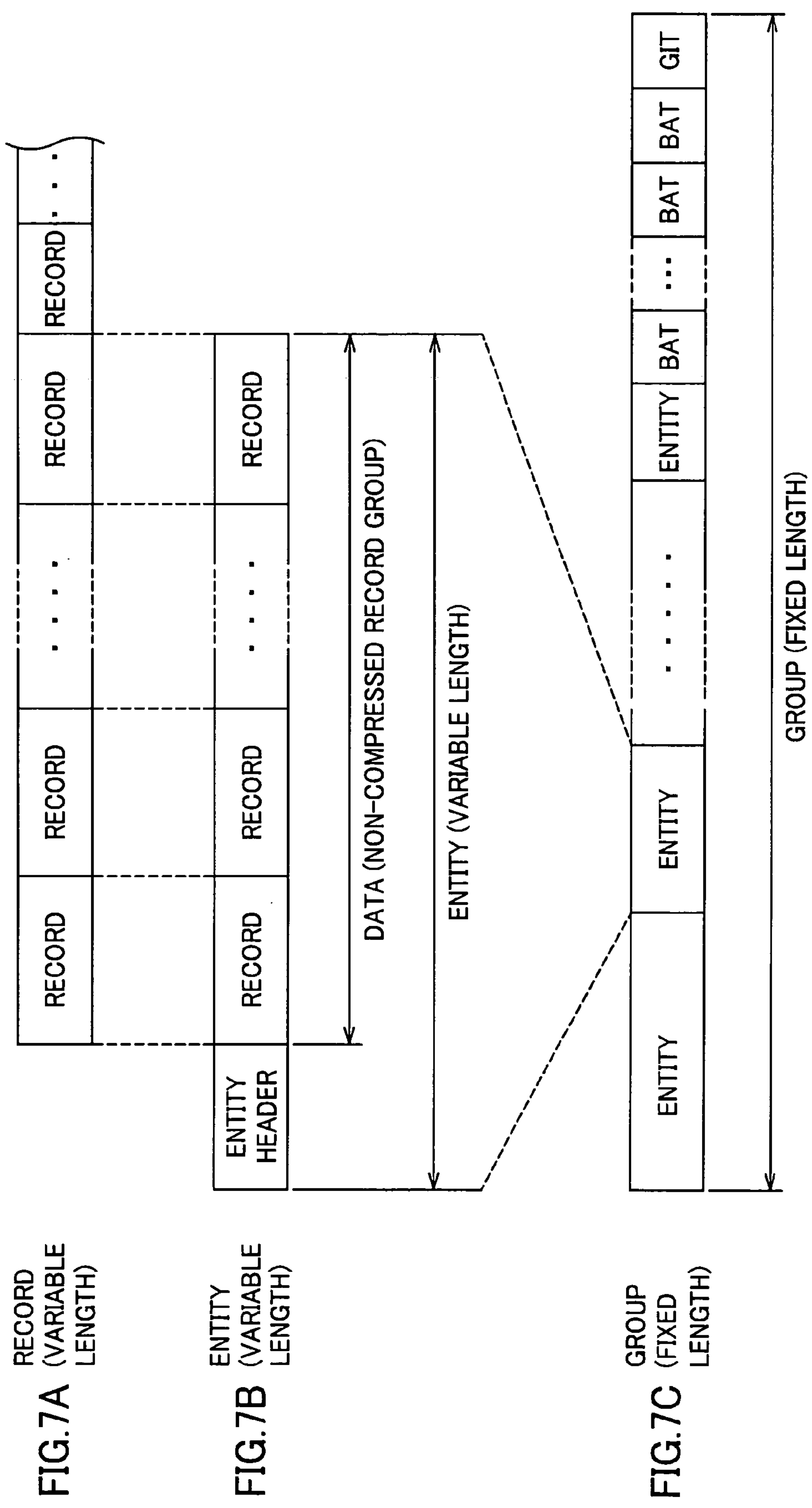
FIGS. 7A, 7B and 7C are diagrammatic views showing the processing of grouping by non-compressed records (Records).

Referring to FIGS. 7A and 7B, the grouping processing is explained for a case where the records as input data are not compressed.

If, with the tape streamer drive 10, data is input from the host computer 40 on the record basis, as shown in FIG. 7A, the setting in this case is to prohibit compression processing by the compression/expansion circuit 21. In this case, the entity is formed by a group of non-compressed records, as shown in FIG. 7B. The group shown in FIG. 7C is formed as by fitting the so formed entities. Even in this case, plural entities, plural BATs and one GIT are arranged, as in the case of FIGS. 6A to 6C.

As may be seen from the foregoing, the tape streamer drive 10 of the present invention forms an entity from plural records, for data input on the record basis, without dependency on whether or not the data is compressed data. These entities are utilized to from the group. The entity is prescribed in order to take into account the fact that there are occasions where the data transmitted on the record basis are compressed by the compression/expansion circuit 21. That is, when data input on the record basis from the host computer 25 is compressed, the data size of the records following the compression differ with data contents if the data size is checked on the record basis. For example, it is assumed that the records are not formed into entities and are formed into a group, such as by fitting. If, in this case, the record is not compressed, but remains fixed in length, the number of records forming one group is uniquely determined, and hence the data read out from the magnetic tape 3 can be processed on the record basis. However, if, when the record is compressed so that it is of a variable length, the record is not formed into an entity but is directly fitted to the group, the number of the records in a group cannot be identified. Consequently, optimum data reproduction cannot be achieved.

Thus, the compressed records are formed into entities and the group is formed from these entities, as already explained with reference to FIGS. 6A to 6C. By so doing, data can be optimally reproduced on the record basis by referring to the contents of the entity header in the entity, even if the record is of variable length as a result of compression.

The reason the grouping is made after forming the entity even in the absence of record compression, as shown in FIGS. 7A to 7C, is as follows:

If the uncompressed record is directly formed into a group, the BAT is written not as the information pertinent to the entity, but as the information pertinent to the records, so that the BAT is usually of an extremely large data size per group, as compared to the group of the compressed data.

If the uncompressed record is directly formed into the group, data is read out such as by referring to the access entry of the BAT per record recorded in a group, thus presenting a problem that access speed cannot be increased.

If the entity is formed even for uncompressed records, the BAT access entry is written as the information pertinent to the entity. This reduces the number of access entries of the BAT, even if the data is uncompressed data, thus enabling the data size to be reduced. The bandwidth of the BAT in the group is reduced for correspondingly increasing the storage area for user data and the volume of the recordable data.

During reproduction of the uncompressed data, access entries stored as the entity-based information may be referenced to read out data. That is, the accessing speed may be increased because the readout may be made in terms of the data size of the plural record groups as a unit.

Meanwhile, if the application operating on the side of the host computer 40 causes its own data (application data) to be recorded on the magnetic tape by the tape streamer drive 10, the application data is transmitted to the tape streamer drive 10. The tape streamer drive 10 is responsive to this command from the application 41 to record the transmitted application data on the magnetic tape of the loaded magnetic tape.

The application may specifically be enumerated by an application for compression and/or expansion of data, or so-called archiver, and a backup application used for data backup.

In the present invention, when the application data processed by the application is transmitted, not only is the application data recorded on the magnetic tape of the loaded tape cassette, but the transmitted application data is written from the leading end on the MIC 4 of the loaded tape cassette for storage therein. That is, the application data is cached in the MIC 4.

Figure 9:
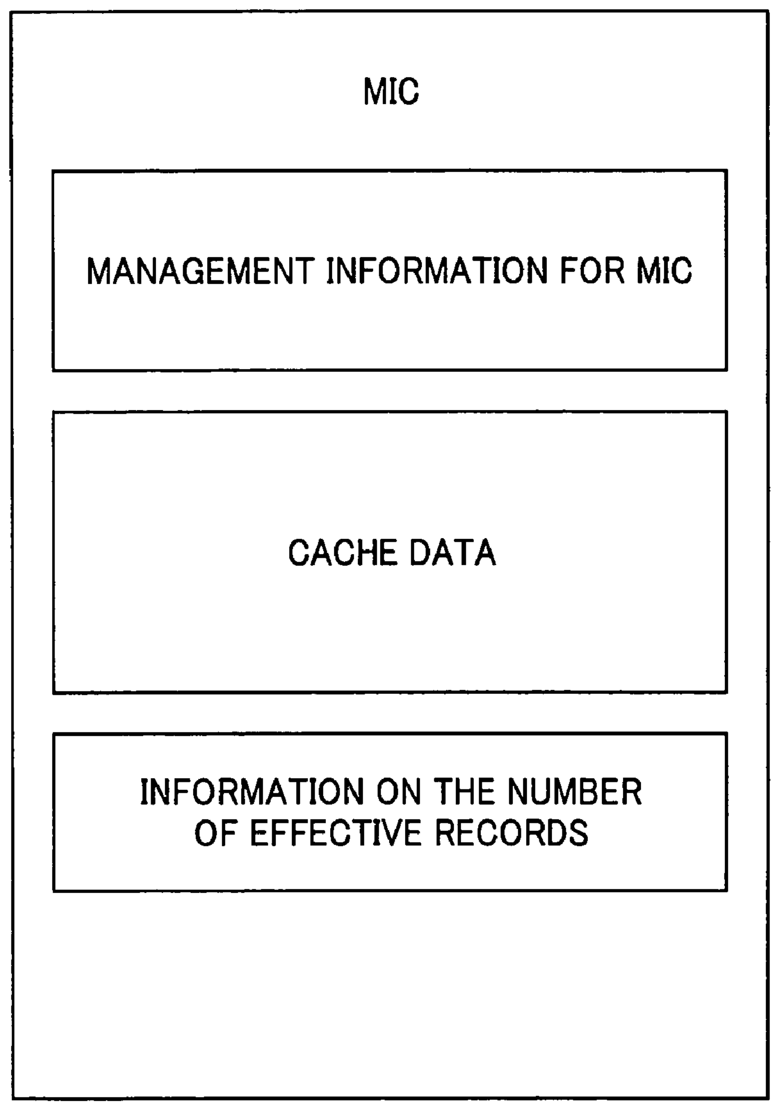
FIG. 9 is a diagrammatic view showing an MIC data structure.

FIG. 9 schematically shows the data management structure of the MIC 4 used in the present invention.

The MIC 4 in the current state has a capacity on the order of 8 KB. In the present embodiment, an area of for example 2 to 3 KB is used as the management information for MIC, with the remaining area on the order of 5 KB to 6 KB being used as an area for cache data in which to cache the application data, and as an area in which to store the information on the number of effective records. The information on the number of effective records, which will be explained subsequently, is the information specifying the number of records, so that approximately several bits, allocated to this information, are sufficient.

The MIC 4 is the capacity on the order of 8 KB at present, with the cache data area that may be provided for caching the application data is 5 to 6 KB. The application data usually has a sizeable data size so that the data size of the application data is larger than the capacity of the cache data area of MIC 4. Thus, caching the application data in MIC 4 is tantamount to cache only the leading data portion of the application data on the order of 5 to 6 KB.

According to the present invention, data of the leading portion of the application data cached in the MIC 4 is used, as later explained, for enabling faster accessing to the target data than is possible in the conventional practice. This point will hereinafter be explained.

Figure 10:
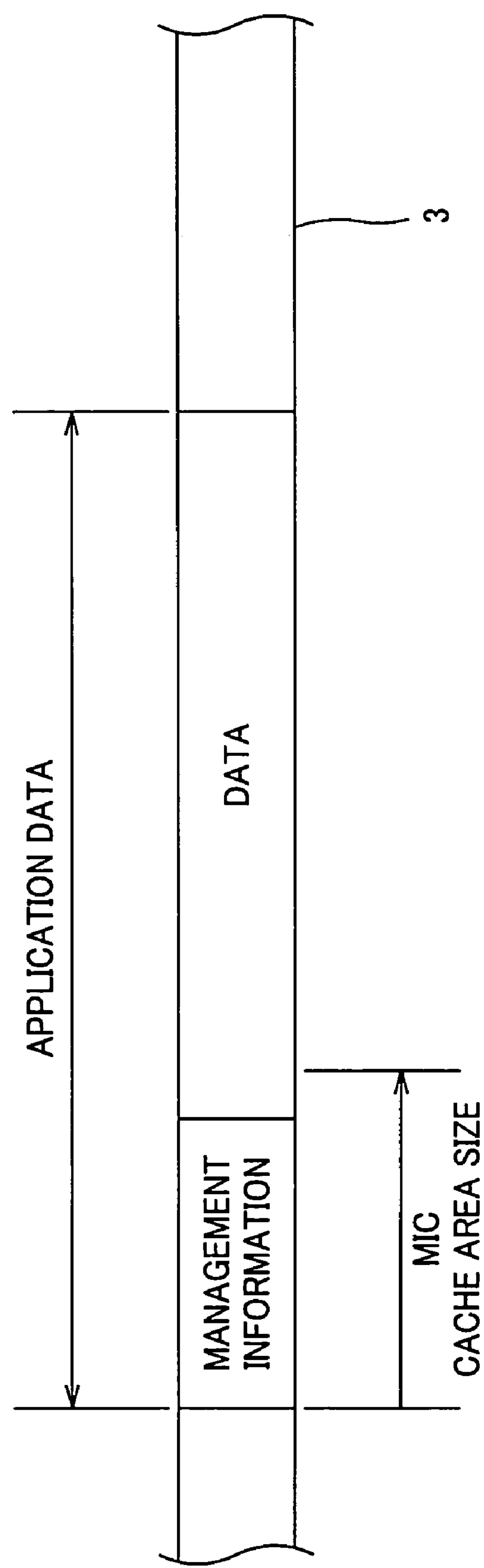
FIG. 10 shows an illustrative structure of application data recorded on a magnetic tape.

FIG. 10 shows the general structure of the application data written by the application on the magnetic tape 3.

Referring to FIG. 10, the application data is composed of the management information, arranged at the leading end, and a data area, next to the management information, in which user data is stored.

The contents of the management information, differing from application to application, may be said to be composed of, for example, a volume label, the information on the data structure, time stamp, author information, check sum and the discrimination information for compression or non-compression depending on the particular application. Of these, the information on the data structure is crucial to the present invention. The information on the data structure is the information for the application to supervise how the data is arrayed in the data area.

When the application reproduces the application data recorded on the magnetic tape 3, the management information at the leading end of the application data is acquired. For example, the information on the data structure, stored in the management information, is first referenced to identify the data location, desired to be accessed, from the application data recorded on the magnetic tape 3. The tape streamer drive 10 is commanded to access this data location (tape position) to execute the reproducing operation. In this manner, the application reproduces and acquires the targeted data from the magnetic tape 3.

According to the present invention, the data in the leading portion of the application data is written and stored in a volume as much as is possible in a cache data area of the MIC 4. This means that the management information in the application data is stored in the cache data area of the MIC 4.

In the current state of the art, the cache data area of the MIC 4 is on the order of 5 KB to 6 KB. The management information of the majority of the application data is of a data size that can be accommodated within 5 to 6 KB. Even if the management information is of a larger size, the information may be comprised in the range from 5 KB to 6 KB, provided that the tape streamer drive 10 executes compression processing in accordance with the ALDC system. That is, if the compression processing is used simultaneously, the management information of the majority of the application data may be stored as it is comprised within the cache area of the MIC 4, as shown for example in FIG. 10.

According to the present invention, the information that can be recorded in the cache area of the MIC 4 is not limited to the management information. That is, if the management information is completely stored in the cache data area and there is still certain storage allowance in the cache data area, as much data as is possible may be written and stored in the leading area of the data area next following the management information.

Figures 11A, 11B:
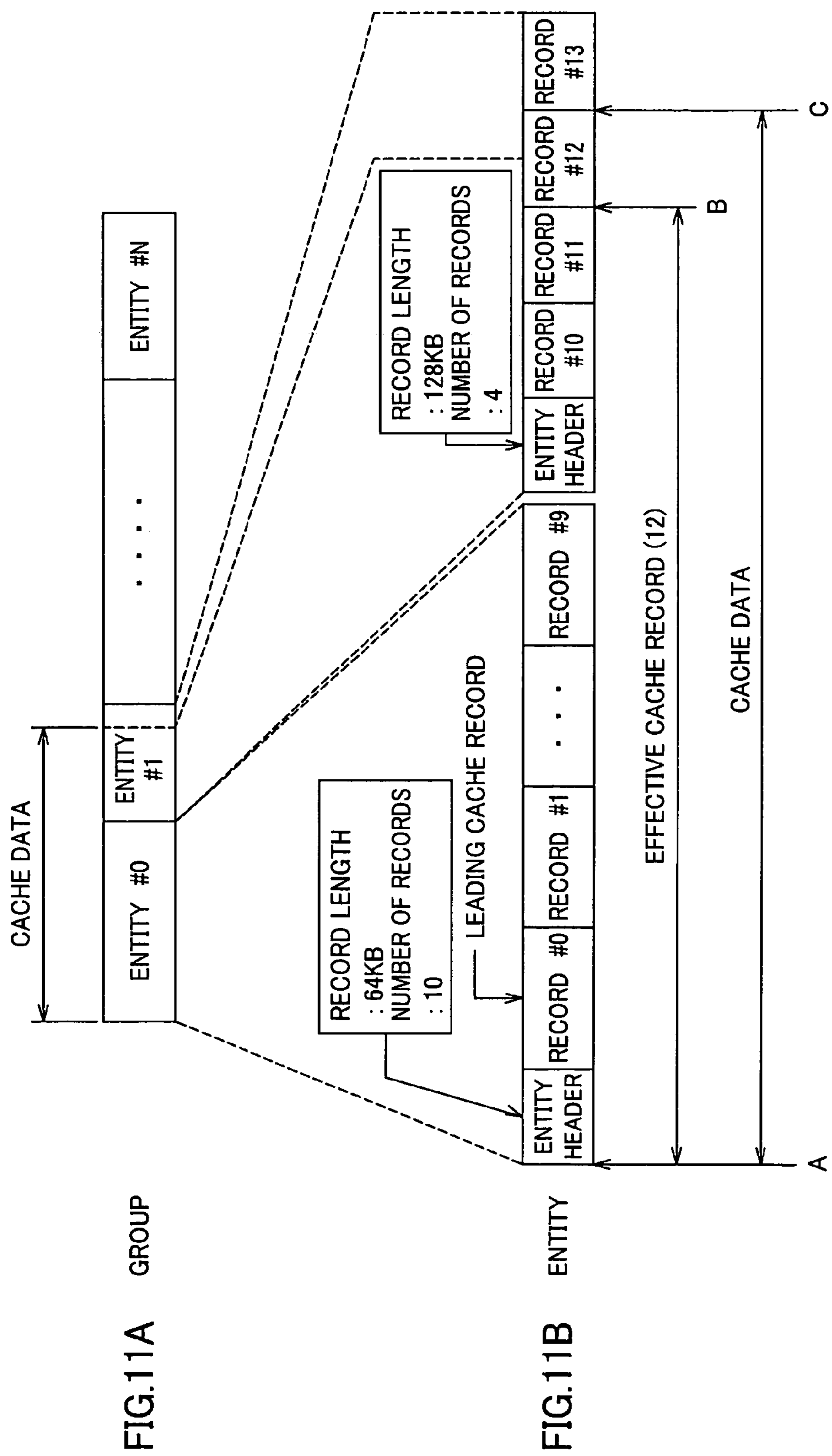
FIGS. 11A and 11B are diagrammatic views showing a data caching operation to an MIC.

Referring to FIGS. 11A and 11B, the relationship between the data caching operation for the MIC 4 and data units is explained. Although the caching operation shown in FIGS. 11A and 11B shows a case where the records are compressed records, the caching operation applies for non-compressed data as well.

FIG. 11A shows data for one group. Among the groups of the set of groups making up the application data to be written in the magnetic tape 3, the group shown in FIG. 11A is the group located at the leading end. This group is made up by N entities of from the Entity #0 to the Entity #N as shown.

According to the present invention, caching for the MIC 4 is from the start position of the application data.

In the case of FIG. 11, the application data is started from the leading end of the group shown in FIG. 11A. Thus, the caching of the MIC 4 data commences from the start position of the first entity #0, as indicated by a range of the [cache data] in FIG. 11A. In this case, the entity #0 is cached in its entirety in MIC 4, while data of the next entity #1 has been cached part way, as shown.

The entity #0 is formed by an entity header and ten records of from record #0 to the record #9 next following the entity header, as shown in FIG. 11B. Accordingly, the Record Number (number of records) of the entity header of the entity #0 indicates 10. Additionally, the Record Length (length of the record) is 64 KB, indicating that the pre-compression record length is 64 KB.

The entity #1, next following the entity #0, is made up by the entity header followed by four records of from Record #10 to Record #13, as shown in FIG. 11B. Consequently, the Record Number (number of records) of the entity header of the entity #1 is 4. On the other hand, the Record Length (length of the record) is 128 KB, indicating that the pre-compression record length is 64 KB.

If the sequence of the entity #0 to #1 shown in FIG. 11B is associated with the cache data, the data from the data position A to the data position C in FIG. 11B is cached in the MIC 4. That is, as for the entity #0, the entity header and the totality of the records from the Record #0 to the Record #9 are cached.

Meanwhile, the writing of the application data in the MIC 4 for caching is to be commenced at the leading end of the application data, as stated previously. Moreover, in terms of the entity unit, data is to be cached necessarily as from the start position of the entity. More specifically, data caching is to be commenced at the entity header of the entity #0, in the case of FIG. 11B or, stated differently, there is no possibility of starting the caching from the Record #0 of the data area with the exclusion of the entity header of this entity #0.

As for the entity #1, the entity header, the Records #10 to #11 belonging to the entity #1 and the data from the leading end of the Record #12 to the data in a forward portion of the Record #12 beginning from the leading end and reaching the data position C are in the cached state.

In terms of the Record unit, the data cached in the MIC 4 are 13 Records of from the Record #0 to the Record #12. However, since the data transmission in the SCSI interface needs to be completed in terms of the Record as a unit, the data cached only part way, for example, the data of the last cached Record #12, are invalid data.

Thus, in the present case, the valid Records of the cached data are 12 Records of from the Record #0 to the Record #11. That is, the number of the effective cache records is 12.

It is the values of the effective cache Records that are recorded in an area of the effective Record number information provided in the MIC 4 data structure shown in FIG. 9.

Meanwhile, the group of the Records as from the Record #0 to the Record #11, effectively cached for the MIC 4, forms the data of the leading end portion of the application data shown in FIG. 10. It should be noted that data having the contents as the management information are usually included in the data composed of the set of the Records, namely the Record #0 to the Record #11.

The caching of the application data, illustrated in FIGS. 11A and 11B, can be uniquely performed on the side of the tape streamer drive 10 in writing the application data on the magnetic tape. Specifically, an application 41, operating on the host computer 40, transmits the application data to the tape streamer drive 10, for writing the data on the magnetic tape. The tape streamer drive 10 then caches the application data in the MIC 4 of the currently loaded tape cassette (the tape cassette having the magnetic tape on which to write the application data) for storage therein, using the transmitted application data, without dependency on the presence or absence of the command from the side of the application.

Figure 12:
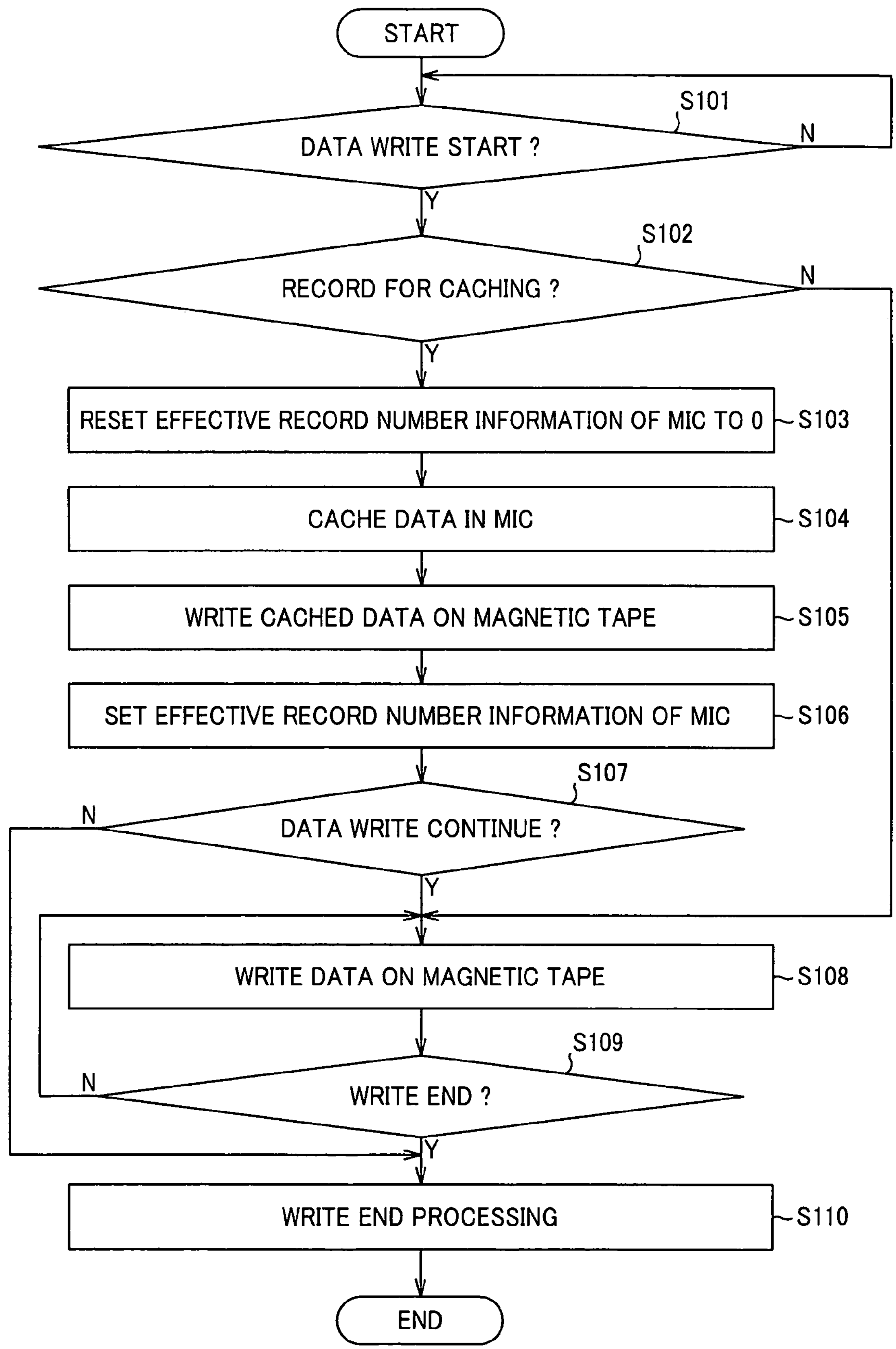
FIG. 12 is a flowchart showing the processing operation in writing data on a magnetic tape.

The flowchart of FIG. 12 shows the processing operations for implementing the caching operation of the application data to the MIC 4 by the tape streamer drive 10 as described above the processing shown in FIG. 12 is executed by the system controller 15 of the tape streamer drive 10.

First, in a step S101, the system controller 15 is in a standby state in readiness for start of writing the application data. If a data write command is produced by a command from the host computer 40, and the transfer of the application data is commenced, the system controller 15 transfers to a step S102.

In a step S102, it is checked whether or not the first Record of the application data transmitted is the Record to be cached. That is, if the application data commanded to be written is the data the writing of which is started from the leading end management information, the application data is the Record to be cached. If conversely the data is the application data but the data not containing the management information, that is not the data at the beginning end of the application data, such as data to be overwritten from an intermediate location in the data area, the data is not the Record to be cached.

If the result of check in this step S102 is negative, the system controller proceeds to a step S108. The processing in this step S108 is explained subsequently. If the result of check in this step S102 is affirmative, the system controller proceeds to a step S103.

In this step S103, the system controller accesses the MIC 4 of the currently loaded MIC 4 to execute the processing of resetting the information on the number of effective records of the MIC 4 to zero.

In the next step S104, the system controller executes the processing of caching the transmitted application data in the MIC 4. That is, the application data is transmitted from the host computer 40 via SCSI interface on the Record basis, so as to be grouped, as shown in FIGS. 5 and 6, using the buffer memory 23 as a work area.

As described above, the system controller 15 reads in the application data, held in the>blocked state=in the buffer memory 23, beginning from the leading end, to transfer the read-in data to the MIC 4.

If the MIC is the remote MIC 4A, the data read-in from the buffer memory 23 is transmitted to the remote memory interface 30 for radio transmission of the data to the remote MIC 4A. This remote MIC 4A then writes as much received data as possible in the cache data area.

If the MIC is the contact type MIC 4B, the system controller 15 accesses the contact type MIC 4B through connector 27 to transmit the data. The contact type MIC 4B sequentially writes as much data as possible in the cache data area.

When the writing in the cache data area of the MIC 4 is completed to its full capacity, the effect of completion of writing is notified from the MIC 4 to the system controller 15. Responsive to this notice, the system controller 15 halts the caching processing to the MIC 4.

In a stage when the caching of the application data to the MIC 4 has come to a close as described above, at least the management information of the application data has been stored in the Mic 4, as shown for example in FIG. 10.

When the caching operation to the MIC 4 in the step S104 has come to a close, the system controller proceeds to a step S105.

In the step S105, the signal processing for writing the data cached to the MIC 4 on the magnetic tape is executed. That is, by the processing in the step S104, the data stored in the cache data area of the MIC 4 is read out and transmitted so that the read-out data is transmitted once through the IF/ECC controller. The data thus transmitted is output at the RF processor 19. As the magnetic tape 3 is controlled as to running, the data stored in the cache data area of the MIC 4 is written on the magnetic tape 3.

In the present invention, the data is written on the group basis. However, the size of the cache data of the MIC 4 under the current state of the art is not up to the group data size.

Thus, if the data size of the application data is larger than the size of the cache data area of the MIC 4, processing of the step S105 and processing of a step S108 as later explained are carried out approximately simultaneously so that a group is actually formed from rear data not cached in the MIC 4 to effect the recording on the magnetic tape 3.

On the other hand, if the application data has been completed only with the data cached in the MIC 4, it is sufficient if dummy data is added to the cache data in the processing in the step S105 to effect recording on the magnetic tape 3.

By the recording control processing in the step S105, at least the leading portion of the application data is recorded on the magnetic tape 3 with the same data size as that of the data cached on the MIC 4. The data recorded on the magnetic tape 3 has the same data contents as those of the leading portion of the application data cached on the MIC 4. In this stage, the system controller 15 already counts and comprehends the number of effective records on the data cached in the cache data area of the MIC 4. Thus, in the processing of the next step S106, the number of the effective records is written and set for the MIC 4.

In the next step S107, it is verified whether or not the data writing is to be continued further. Specifically, the data size of an application differs with the data contents. For example, if the application data to be now recorded on the magnetic tape 3 is small such that the data has been stored in its entirety in the cache data area of the MIC 4, there is no necessity for continuing data writing, and hence a negative result is obtained in the step S107.

If conversely the data size of the application data is larger than the size of the cache data area of the MIC 4, transmission of the application data from the host computer 40 is continued, by the processing of step S105, even after writing the data cached in the MIC 4 on the magnetic tape. Since these transmitted data needs to be written on the magnetic tape 3, an affirmative result is obtained in the step S107.

If the negative result is obtained in the step S107, the system controller proceeds to a step S110. The processing of the step S110 will be explained subsequently. If conversely a affirmative result is obtained in the step S107, the system controller proceeds to the step S108.

In this step S108, the control processing of writing the remaining application data, continuously transmitted from the host computer 40 as described above, on the magnetic tape 3, is carried out. Meanwhile, when the processing in the step S108 is commenced, the control processing is executed for writing the remaining data so that these remaining data will be merged to the portion of the application data written on the magnetic tape by the previous processing in the step S105.

If the processing has transferred to the step S108 by the negative result obtained in the step S102, the data transmitted from the host computer 40 is written on the magnetic tape 3, beginning from the leading end of the data.

The data writing processing on the magnetic tape 3 in the step S108 is continued until it is verified in the next step S109 that the writing has come to a close. For example, if the end of data transfer from the host computer 40 is confirmed, such that the end of the writing is verified, the system controller proceeds to the step S110 to execute the writing end processing.

In this manner, the data written in the maximum possible volume beginning from the leading end of the application data is cached and stored in the cache data area set in the storage area of the MIC 4. This means that caching is made in such a manner that the management information necessary for managing the application data among the data species making up the application data is positively maintained. It is because the management information of the application data is usually arranged in the leading end of the entire application data, as also shown in FIG. 10. That is, according to the present invention, such a tape cassette including the magnetic tape and MIC 4 is provided, in which the application data is stored on the magnetic tape and in which the leading portion of the application data recorded on the magnetic tape, including the management information, is stored in the MIC 4.

Since the tape cassette as described above is obtained, the present invention has the following merits:

In reproducing application data from the magnetic tape 3, the application 41 on the host computer 40 has to acquire the management information in the application data first of all. To this end, the conventional practice has been for the tape streamer drive to access the management information in the application data to transfer the management data to the host computer 40. The tape streamer drive 10 then is responsive to the commands of the application on the host computer 40 on the side of the host computer 40, which has referenced the management information to access the tape position, where the target data is recorded, in order to read out the data.

If the management information in the application data in the MIC 4 is stored, in accordance with the present invention, and the management information is requested from the application, it is sufficient if the data stored in the MIC 4, that is, the management information, is read out and transferred to the host computer 40, without the necessity of accessing the magnetic tape 3. The tape position where the target data is recorded is then accessed, responsive to the commands of the application. That is, with the present invention, the accessing to the magnetic tape for reading out the management information is not necessary, with the present invention, so that it is possible to reduce the time since response to the request for the management information from the application until data accessing.

As a matter of course, the physical running of the magnetic tape is attendant on the accessing to a required position on the magnetic tape, thus requiring considerable time depending on the data position before start of the accessing. Consequently, the fact that the process of accessing a certain target position on the magnetic tape may be eliminated as in the present invention is highly convenient in reducing the time until data accessing.

If the remote MIC 4A is provided as the MIC 4 on the tape cassette 1, data transmission/reception is by radio communication. Thus, the management information of the application data may be read out without the necessity of loading the tape cassette 1 on the tape streamer drive 10.

The present Applicant has already proposed, for example, a technique for reading out or writing data for the remote MIC without the necessity of loading the tape cassette having the remote MIC on the tape streamer drive.

An instance of such technique is to provide the remote memory interface 30 in the tape streamer drive 10 in the vicinity of a casing of the tape streamer drive 10. Since an antenna position of the MIC of the tape cassette 1 can be approached to a preset position of the casing, the MIC data can be read by the tape streamer drive 10 without the necessity of loading the tape cassette 1.

This technique is such a one in which a portable reader and writer device capable of communication with the MIC is connected to the host computer 40 and is used to read out or write data for the MIC not loaded on the tape streamer drive 10.

Thus, if this technique is utilized, the portion of the application data cached in the MIC 4 (management information) may be read out and transmitted to the application on the host computer 40, through the tape streamer drive 10 or the reader and writer device, without the necessity of loading the tape cassette 1 on the tape streamer drive 10.

In this case, the operation may similarly be started from the operation of directly accessing the target data position, responsive to a request from the application, on loading the tape cassette 1 on the tape streamer drive 10, without the necessity of accessing the management information for the application data recorded on the magnetic tape 3. This reduces the time needed until data accessing.

On the other hand, if the side application has the function of holding and supervising the management information of data of plural applications, and such management information needs to be collected, the operation may be facilitated. That is, the management information may be acquired easily and in a shorter time, by approaching the antenna portion to a preset position of the main body unit of the tape streamer drive 10 or by reading out the management information by the reader and writer device, as described above, without the necessity of sequentially loading the tape cassette 1, having the application data recorded thereon.

Moreover, according to the present invention, the management information of the data of a given application is recorded not only on the magnetic tape 3 but also on the MIC 4 in the same tape cassette 1. This may be said to be tantamount to dual recording of the management information of the application data in one and the same tape cassette 1, thus improving the reliability in protection of the management information as compared to the case of recording the management information of the application data only on the magnetic tape.

As may be seen from the foregoing, it is necessary, in reading out the application data, to acquire the management information of the application data on the side application. Consequently, the portion of the area of the application data recorded on the magnetic tape 3 accessed most frequently is the portion of the management information, so that the portion of the magnetic tape 3 for the management information is most susceptible to damages. However, if the management information recorded on the magnetic tape 3 is damaged to such an extent that regular readout is impossible, but the management information of the application data has been recorded in the MIC 4, this management information, recorded on the MIC 4, may be utilized to access the data as a rescue measure. In light of this, the storage of the application data in the MIC 4 leads to marked improvement in reliability in data reproduction.

According to the present invention, caching the application data in the MIC 4 is carried out as shown in FIGS. 11A and 11B, that is, the caching is necessarily performed beginning from the leading end of the entity header. This means that the data is cached in the MIC 4 such as to enable entity-based management. The entity is a data unit designed to enable record-based management, even if the record is compressed, as explained previously. Since the cache data of the MIC 4 may be supervised on the entity basis, the cache data can be processed on the record basis without dependency on whether or not the record is compressed. Since the record is the data transmission unit in the SCSI interface, the fact that the data can be processed on the record basis means that the cache data of the MIC 4 can be unobjectionably transmitted over the SCSI interface to the host computer 40.

Figure 13:
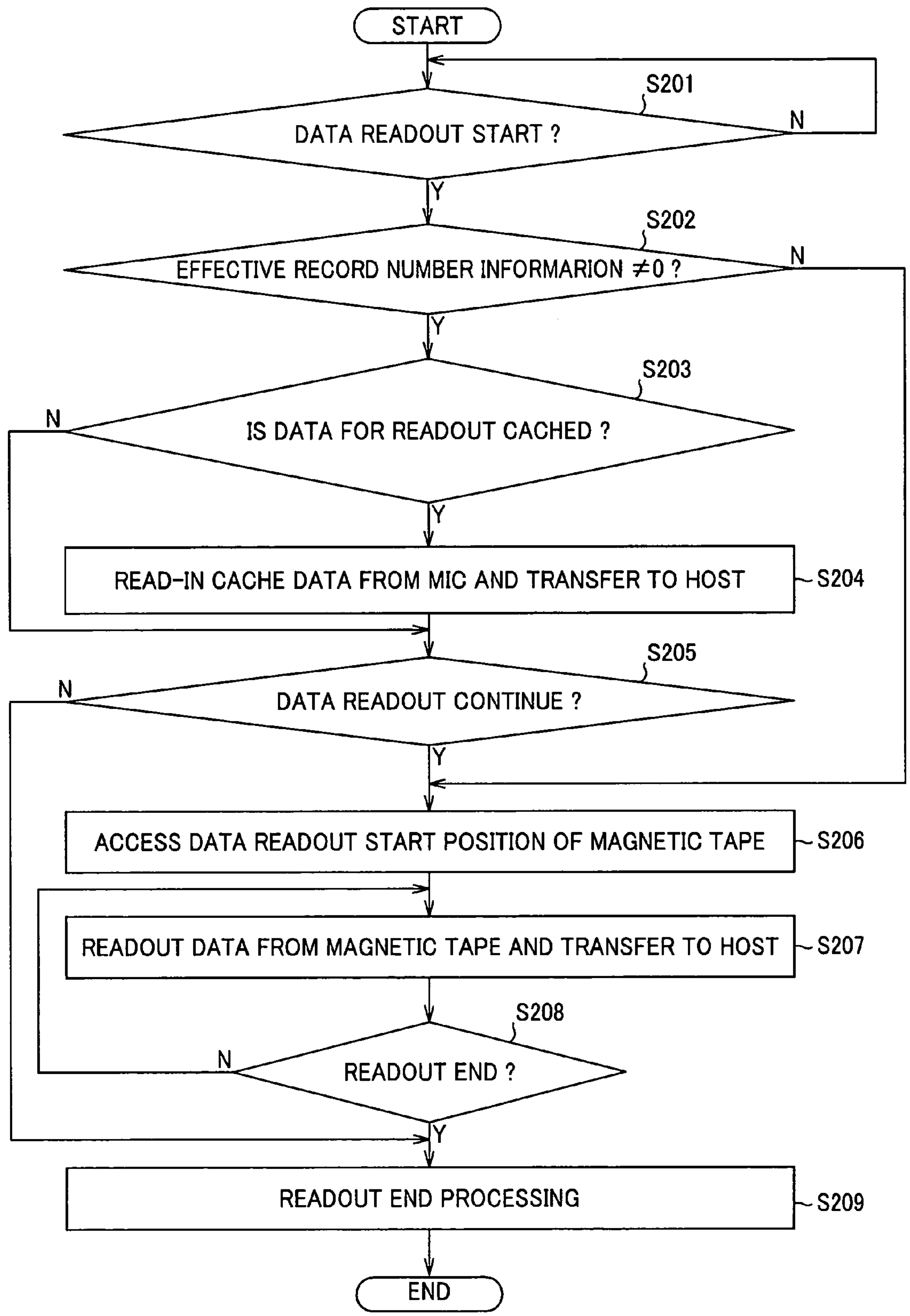
FIG. 13 is a flowchart showing the processing operation in reading out data from the magnetic tape.

The flowchart shown in FIG. 13 shows the processing operations, corresponding to the operation of the tape streamer drive 10 in reproducing the application data from the tape cassette having the MIC 4 in which the application data has been cached. The processing shown in this figure is also carried out by the system controller 15.

First, in a step S201, the system controller 15 is at a standby state ready for starting data readout. On receipt of a command for data readout from the application 41, running on the host computer 40, the system controller 15 proceeds to the processing beginning from step S202.

In this step S202, the system controller 15 refers to the information on the number of effective records stored in the MIC 4 to check whether or not this value of this information on the number of effective records is different than zero. If the negative result is obtained, with the information on the number of effective records=0, no data has been cached in the MIC 4, so that the system controller 15 directly proceeds to processing in a step S206. The processing in the step S206 will be explained subsequently. If the affirmative result is obtained, with the information on the number of effective records . . . 0, data has been effectively stored in the cache data area of the MIC 4. In this case, the system controller 15 proceeds to a step S203.

In this step S203, the system controller refers to the contents of data currently cached in the cache data area of the MIC 4 to verify whether or not this data is of the contents desired to be read out. If the data to be read out is data other than the application data cached in the MIC 4, the negative result is obtained, so that the system controller skips the processing of step S204 to proceed to the processing of step S205. If conversely the data to be read out is the application data cached in the MIC 4, and specifically the application 41 requests the management information, the affirmative result is obtained. In this case, the system controller proceeds to a step S204 to read out data from the cache data area of the MIC 4 to transmit the data through the SCSI interface to the host computer 40. By so doing, the host computer 40 acquires the management information for the application data as an object to be read out.

In the step S205, the system controller has communication with the application 41 to check whether or not the data readout is to be continued. For example, if the data requested by the application of the host computer 40 not more than the data cached in the MIC 4 suffices, there is no necessity of reading out data further, so that a negative result is obtained.

The case in which the data requested by the application of the host computer 40 not more than the data cached in the MIC 4 suffices may be exemplified first of all by such a case in which the data requested by the application 41 may be no more than the management information.

Even if the data required by the application 41 is not simply the management information and is the user data, such as a file, in a data area next following the management information, there is no necessity of continuing the data readout in such a case where the cache data transmitted by the processing of the previous step S204 includes a user data portion of the next following data area in addition to the leading management information and where the user data targeted by the application 41 is already present in a portion of the data in this data area. In such case, a negative result is again obtained in the step S205.

For example, the capacity of the MIC 4 in its entirety is made to be on the order of 8 KB, while the storage capacity of the cache data area is made to be 5 KB to 6 KB. However, it may be contemplated that the storage capacity of the MIC 4 is drastically increased in future such that the storage capacity of the cache data area is also increased drastically. The larger the storage capacity of the cache data area, the higher becomes the probability that the user data targeted by the application is contained in the cache data transmitted from the MIC 4 to the application 41. That is, if it is unnecessary to access the management information recorded on the magnetic tape, and the user data requested by the application 41 has also been cached, the accessing to the user data recorded on the magnetic tape is also unnecessary.

If the negative result is obtained in the step S205, the readout end processing is executed in a step S209 where the readout end processing is carried out to terminate the data readout processing. If conversely the data targeted by the application 41 has not been acquired such that the data readout needs to be continued, the affirmative result is obtained in the step S205, so that the system controller proceeds to a step S206.

In the step S206, the data readout start position of the magnetic tape in the currently loaded tape cassette is accessed. For this accessing, the system controller 15 determines the tape location, responsive to the readout data specified from the application 41, and accesses the so determined tape location.

If the step S206 is reached through the processing of transmitting the cache data of the MIC 4 to the host computer 40 in this step S204, the readout data specified by the application 41 becomes the user data in the data area specified based on the management information acquired by the processing in the step S204. Thus, the processing of step S206 is the processing of accessing the readout start position for reading out the user data. That is, as already explained, if the cache data (management information) is acquired by the application 41, the necessary user data can be accessed immediately, so that it is unnecessary to access the management information on the magnetic tape.

After accessing the data readout start position of the magnetic tape in the step S206, data is read out from the magnetic tape as the processing of step S207 to carry out the control processing of transmitting the so read out data to the host computer 40.

The processing in this step S207 is continued until the end of readout in the next step S208 is determined in the next step S208. If all user data requested by the application 41 has been read out, and the end of the readout is determined in the step S208, the system controller proceeds to a step S209. In this step S209, the readout end processing as required is executed.

The present invention is not limited to the embodiments described with reference to the drawings such that various changes, substitutions or equivalents may be envisaged without departing from the scope and the purport of the invention.

In the above-described embodiment, a tape streamer drive having a tape cassette of an 8 mm VTR as a recording medium as a standard is stated as an example. The present invention is applicable to a system composed of a tape cassette and a tape streamer drive by other standards, provided that such system is provided with a memory device. For example, the present invention is applicable to a system composed of a single reel tape cassette and a tape streamer drive adapted therefor.

Moreover, according to the present invention, transmission data units, termed a fixed length record, are assembled to an entity (processing data unit) and formed into a group as a recording unit for the magnetic tape. The recording format to the magnetic tape is, however, not limited to this configuration. Briefly, it is only sufficient if the format is such a one capable of processing a data transmission unit for transmission/reception with the external host on the tape drive device and of transforming the transmission unit into a processing data unit having the header information.

The present invention is not limited to the embodiments described with reference to the drawings and, as may be apparent to those skilled in the art, various changes, substitutions or equivalents may be envisaged without departing from the scope and the purport of the invention as defined in the appended claims.

INDUSTRIAL APPLICABILITY

According to the present invention, in which, when the application data is recorded on a tape cassette having the magnetic tape and the memory device (MIC), not only is the application data recorded on the magnetic tape, but the application data to be recorded on the magnetic tape is recorded in an area of a preset size of the MIC, beginning from the leading end of the application data to be recorded on the magnetic tape, the application data in its entirety is recorded on the magnetic tape of the tape cassette, and the application data of a data size conforming to the recording capacity is recorded in the MIC from the leading end of the data. Since it is the management information of the application that is recorded at the leading end of the application data, it is possible to record at least the management information in the MIC.

In reproducing the application data from this tape cassette, the management information recorded in the MIC may be used. Thus, the time for accessing the management information recorded on the magnetic tape is not needed, and hence it becomes possible to reduce the time since accessing the targeted user data until readout may be correspondingly reduced.

According to the present invention, the application data is formed into a processing data unit (entity) that can be processed by the tape drive device by a transmission data unit (record) for transmission with the host, and the application data is cached in the MIC by this processing data unit, so that, by referring to the header information of the processing data unit, data transmission between the tape drive device and the host becomes possible without dependency on whether or not the processing data unit is already compressed, thus allowing efficient cache data handling by the MIC on the system.

The invention claimed is:

1. A tape driving apparatus for recording and/or reproducing data for a tape cassette having housed therein a magnetic tape and a memory, said tape driving apparatus comprising:

tape driving means for recording and/or reproducing data for the magnetic tape in a loaded position of the tape cassette;

memory write control means for writing and storing application data, which is data to be recorded on the magnetic tape by said tape driving means and which is handled by preset application software, in a storage area of a predetermined capacity in said memory beginning from a leading position of said application data;

memory readout means for reading at least said application data from said memory of said tape cassette; and transmission means transmitting said application data read out from said memory by said memory read out means to a host side of the tape driving apparatus as data read out from the magnetic tape.

2. The tape driving apparatus according to claim 1 further comprising data unit converting means for converting said application data into a processing data unit composed of a data part made up of a set of one or more transmission data units, each transmission data unit being of a fixed length, and a header part including required information for said data part, arranged at the leading position of the application data, said processing data unit allowing processing by a tape driving apparatus adapted for data recording and/or reproduction for said tape cassette.

* * * * *

UNITED STATES PATENT AND TRADEMARK OFFICE

CERTIFICATE OF CORRECTION

PATENT NO. : 7,164,551 B2
APPLICATION NO. : 10/474161
DATED : January 16, 2007
INVENTOR(S) : Masahiro Urano et al.

It is certified that error appears in the above-identified patent and that said Letters Patent is hereby corrected as shown below:

Title page, item [54], the title should read --TAPE CASSETTE AND TAPE DRIVING APPARATUS--; and Column 1, the title should read --TAPE CASSETTE AND TAPE DRIVING APPARATUS--.

Signed and Sealed this

Thirteenth Day of November, 2007

JON W. DUDAS
*Director of the United States Patent and Trademark Office*